United States Patent [19]

Fetterman

[11] 4,002,594
[45] Jan. 11, 1977

[54] SCORCH RETARDANTS FOR RUBBER REINFORCED WITH SILICEOUS PIGMENT AND MERCAPTO-TYPE COUPLING AGENT

[75] Inventor: Miles Q. Fetterman, Seville, Ohio

[73] Assignee: PPG Industries, Inc., Pittsburgh, Pa.

[22] Filed: July 8, 1975

[21] Appl. No.: 594,163

[52] U.S. Cl. .......................... 260/42.37; 260/42.32; 260/42.33; 260/42.47; 260/42.49; 260/765; 260/784; 260/786; 526/295; 526/335; 526/336; 526/338; 526/340

[51] Int. Cl.² ...................... C08K 3/34; C08K 3/36

[58] Field of Search ............... 260/42.15, 765, 784, 260/786, 42.32, 42.33, 42.37, 42.47, 42.49; 526/295, 335, 336, 338, 340

[56] References Cited
UNITED STATES PATENTS

| | | | |
|---|---|---|---|
| 3,364,059 | 1/1968 | Marzocchi | 260/448.8 |
| 3,768,537 | 10/1973 | Hess et al. | 260/765 |
| 3,798,196 | 3/1974 | Rocktaschel et al. | 260/42.37 |
| 3,838,114 | 9/1974 | Lawrence | 260/786 |
| 3,842,111 | 10/1974 | Meyer-Simon et al. | 260/448.8 |
| 3,873,489 | 3/1975 | Thurn et al. | 260/42.15 |
| 3,910,864 | 10/1975 | Son | 260/786 |

OTHER PUBLICATIONS

Alliger et al., Vulcanization of Elastomers (Reinhold) (N.Y.) (1964), p. 180.

*Primary Examiner*—Donald E. Czaja
*Assistant Examiner*—H. H. Fletcher
*Attorney, Agent, or Firm*—William M. Dooley

[57] ABSTRACT

Rubber vulcanizates reinforced with siliceous pigment have desirable properties. The addition of a mercapto-type coupling agent hastens curing and strengthens adhesion between the rubber polymer and the silica, but tends to cause premature vulcanization or scorch. The further addition of a thiomorpholine compound such as 4,4'-dithiodimorpholine or 2-(4-morpholinothio)-benzothiazole retards scorch and improves stress/strain properties and abrasion resistance, but affects curing time only moderately.

24 Claims, No Drawings

SCORCH RETARDANTS FOR RUBBER REINFORCED WITH SILICEOUS PIGMENT AND MERCAPTO-TYPE COUPLING AGENT

BACKGROUND OF THE INVENTION

This invention relates to the use of certain thiomorpholine compounds in sulfur-vulcanized rubber reinforced with a siliceous pigment and a coupling agent. It more particularly pertains to the use of thiomorpholines such as 4,4'-dithiodimorpholine and 2-(4-morpholinothio)-benzothiazole for retarding scorch and improving vulcanizate properties of a rubber compound containing siliceous pigment and a polyfunctional coupling agent having a functional group capable of bonding to the siliceous pigment and a sulfur functional group, such as a mercapto group, capable of bonding to the rubber polymer. It pertains also to rubber compounds containing silica, a coupling agent, and a thiomorpholine scorch retardant, and to vulcanizates of such compounds.

When reinforcing siliceous pigments such as pyrogenic and precipitated silicas are used as fillers in rubber compounds, they give highly desirable characteristics to the resulting vulcanizate. Rubber vulcanizates filled with silica have good resistance to tearing, cutting, flex cracking, and aging, and in addition can be made in white or light colors.

Certain coupling agents are known which strengthen adhesion between the siliceous pigment and the rubber polymer. The coupling agents are generally bifunctional compounds capable of bonding to the siliceous particle and to the rubber polymer under rubber compounding and vulcanizing conditions. The bond to the silica particle is preferably through a silicon-containing group capable of reacting with the silanol groups covering the surface of the particle. The bond to the rubber polymer is preferably through a mercapto group on the coupling agent.

Preferred coupling agents are the mercaptoalkyl silanes, particularly mercaptoalkyltrialkoxysilanes such as 3-mercaptopropyltrimethoxysilane and 2-mercaptoethyltriethoxysilane. Rubber vulcanizates reinforced with silica and these coupling agents show better stress/strain properties, lower heat buildup and permanent set, and greater resistance to abrasion than rubbers reinforced only with silica.

Sulfur-vulcanized rubber compounds containing silica tend to be rather slow curing. Mercapto-type coupling agents, especially in higher quantities, increase the rate of cure but unfortunately can reduce scorch time to unacceptable levels. They are also relatively costly. The tendency of a rubber compound to scorch makes compounding and processing more difficult. Mixing and milling must be done more quickly yet at lower temperatures so that the compound will not begin to vulcanize before it is shaped or molded. Scorch can render a rubber compound stiff, lumpy, and useless. A rubber compound containing silica and a mercaptotype coupling agent, yet having a relatively long scorch time and a reasonably fast rate of cure, would be especially desirable.

A recognized method for increasing the rate of cure is to add a secondary accelerator commonly a guanidine derivative such as diphenylguanidine, in addition to sulfur and an accelerator. Secondary accelerators do increase the cure rate, but they also can reduce scorch time. Using conventional accelerator adjustments in formulating a fast-curing rubber compound containing silica and a mercapto-type coupling agent, unacceptably short scorch times were encountered.

Thiomorpholine accelerators are well known in the art for use in sulfur-vulcanized rubber compounds. Two recent patents, U.S. Pat. Nos. 3,852,250 and 3,852,251, disclose the use of thiomorpholine accelerators in combination with benzothiazole disulfide or sulfenamide accelerators and sulfur to provide vulcanizates with improved physical properties. The cited patents neither disclose the use of coupling agents nor the problem of excessive scorchiness associated with the use mercaptotype coupling agents in silica-filled, sulfur-vulcanizable rubber.

SUMMARY OF THE INVENTION

It has now been discovered that the tendency of mercapto-type coupling agents to cause scorch or premature vulcanization of sulfurvulcanized, silica-reinforced rubber compounds can be controlled by the addition of compounds containing a thiomorpholine group

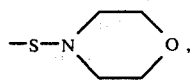

such as 4,4'-dithiodimorpholine, 4-mercaptomorpholine, and 2-(4-morpholinothio)-benzothiazole. Surprisingly, when thiomorpholine accelerators are used in accordance with the present invention, they substantially retard scorch times, yet only moderately affect the rate of cure. Furthermore, many properties of the vulcanizate, such as stiffness, tensile strength, hardness, and resistance to heat buildup and abrasion, are usually enhanced by the use of the scorch retardants. The scorch retardant is preferably incorporated into a masterbatch containing the rubber, the siliceous pigment, and the coupling agent before the sulfur and the vulcanizing agents are added.

DETAILED DESCRIPTION

The vulcanizable rubber compounds of the present invention include a rubber; a siliceous pigment; a coupling agent with a sulfur functional group such as a mercapto group; a thiomorpholine scorch retardant; and a sulfur curative, such as sulfur or sulfur and a vulcanization accelerator, preferably sulfur and a benzothiazyl sulfenamide or benzothiazyl disulfide accelerator. Addition of a secondary accelerator such as a guanidine derivative increases the rate of cure without sacrificing acceptabe scorch time. Furthermore, the rubber compound may contain any of the various additives conventionally included in rubber compounds: activators such as zinc oxide, oil extenders, waxes, plasticizers such as aromatic petroleum oils, antioxidants such as polyamines, carbon black (when white or light color is not desired), and colors.

A typical rubber compound of the present invention may include 100 parts by weight of rubber, 5 to 200 parts of finely divided siliceous pigment, 0.1 to 15 parts of coupling agent, and a sulfur curative which may include 0.1 to 5 parts of sulfur and 0.1 to 3 parts of accelerator. From 0.1 to 6 parts of zinc oxide activator is usually included. Preferably, the rubber compound contains 40 to 90 parts of siliceous pigment, 0.3 to 3 parts of coupling agent, 0.5 to 3 parts of sulfur, 0.5 to 2 parts of accelerator, and 2 to 5 parts of zinc oxide.

The compound will also contain a thiomorpholine scorch retardant in an amount sufficient to retard scorch. The scorch-retarding amount depends upon the amount of coupling agent present, processing conditions, sulfur curatives used, and the desired degree of scorch retardation. Typically the molar ratio of scorch retarding groups, i.e., thiomopholine groups, in the scorch retardant to sulfur groups such as mercapto groups in the coupling agent will be roughly one to one. For example, a typical starting ratio of 2-(4-morpholinothio)-benzothiazole to 3-mercaptopropyltrimethoxysilane is one mole/mole. For 4,4'-dithiodimorpholine a typical ratio is 0.5 mole/mole, because this retardant has two thiomorpholine groups per molecule. In particular rubber compounds, maximum scorch retardation may be achieved by using more or less than the typical amount of scorch retardant. The optimum amount depends upon the rubber polymer, the filler, and the ratio of coupling agent to filler. A useful degree of scorch retardation is obtainable even when the ratio of retardant to coupling agent varies substantially from the typical ratio. From 0.1 to 15 parts by weight of scorch retardant may be used. Typically, 0.1 to 10 parts may be used. Preferably, 0.1 to 6 parts may be used.

The thiomorpholine scorch retardants are represented by the general formula

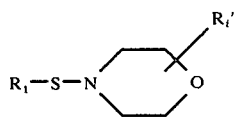

wherein each R' independently is an inert substituent, $R_1$ is an active group, and i, the number of inert substituents, is 0, 1, 2, or 3. Whereever it appears in the specification and in the claims, R' represents an inert substituent, i.e., one that does not interfere substantially with the scorch-retarding function, such as lower alkyl lower alkoxy, and cycloalkyl having up to 8 carbons; halo such as chloro and bromo; nitro; and aryl having from 6 to 12 carbons. Inert substituents other than those named may be present. Although it is not desired to be bound by a particular theory, it is believed from the available information that the thiomorpholine group reacts with the mercapto group of the coupling agent in the rubber compound and thereby temporarily inhibits the mercapto group from scorch-inducing interaction with the other components of the rubber compound.

$R_1$ may be any active group that will allow the thiomorpholine group to retard scorch during processing of the rubber compound. $R_1$ must be an active group, i.e., one which will allow the thiomoropholine group to react with or otherwise neutralize the sulfur group of the coupling agent, but must not adversely affect the properties of the vulcanizate. For example, $R_1$ can be hydrogen, as in 4-mercaptomorpholine and 4-mercapto-2,6-dimethylmorpholine.

In the preferred scorch retardants, $R_1$ is a second thiomorpholine group represented by the formula

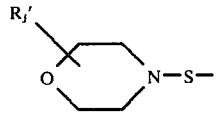

wherein each R' independently is an inert substituent and j, the number of inert substituents, is 0, 1, 2, or 3. Of these preferred scorch retardants, 4,4'-dithiodimorpholine and 2,6-dimethylmorpholine disulfide are particularly preferred.

$R_1$ may be any group joined to the thiomorpholine group through a disulfide bond. $R_1$ may be represented by the formula $R_2-S-$ wherein $R_2$ may be a benzothiazyl group as shown for $R_1$; a lower aliphatic or cycloaliphatic group having from 1 to 12 carbons, such as a methyl, ethyl, butyl, neopentyl, dodecyl, cyclopropyl, cyclobutyl, cyclohexyl group, allyl, butynyl, or cyclohexenyl group; or an aryl group having from 6 to 12 carbons, such as phenyl, tolyl, xylyl, benzyl, and naphthyl groups. $R_2$ may also bear inert substituents. The term "aliphatic" includes alkyl groups and all substituted or unsubstituted, saturated or unsaturated derivatives of alkyl groups. Examples include methyl morpholine disulfide, propyl 2,6-dimethylmorpholine disulfide, allyl morpholine disulfide, and phenyl morpholine disulfide.

$R_1$ may be a benzothiazyl group represented by the general formula

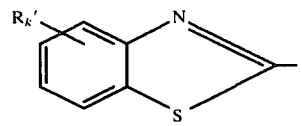

wherein each R' independently is an inert substituent and k, the number of inert substituents, if 0, 1, 2, or 3. Thiomorpholine scorch retardants of this type include 2-(4-morpholinothio)-benzothiazole, 2-(2,6-dimethyl-4-morpholinothio)-benzothiazole, 2-(4-morpholinothio)-5-methylbenzothiazole, 2-(4-morpholinothio)-5-chlorobenzothiazole, 2-(4-morpholinodithio)-benzothiazole, and 2-(3,6-dimethyl-4-morpholinothio)-benzothiazole.

Any sulfur-vulcanizable rubber may be used in the present invention. These rubbers include natural rubber and synthetic rubbers such as styrene-butadiene, ethylene-propylenediene, isoprene, neoprene, chloroprene, and nitrile rubbers. For vulcanizates having a high degree of mechanical strength, butadiene rubber, styrene-butadiene rubber, and natural rubber are preferred. The particular rubber selected will depend on the intended use of the vulcanizate and on the other ingredients employed.

The preferred siliceous pigments are finely divided, precipitated, hydrated silicas, which are obtained by the precipitation of a soluble silicate. A method of preparing such silica is described in U.S. Pat. No. 2,940,830. These pigments have an $SiO_2$ content of at least 50 percent and usually greater than 80 percent by weight on an anhydrous basis. The siliceous pigment should have an ultimate particle size in a range of 50 to 1000 angstroms, preferably between 50 to 400, and more preferably between 150 to 300 angstroms. The BET surface of the pigment as measured using nitrogen gas is preferably in the range of 50 to 600, usually 70 to 300 square meters per gram. The BET method of measuring surface area is described in the Journal of the American Chemical Society, Vol. 60, page 304 (1930).

A typical form of such precipitated silica is Hi-Sil 233, manufactured by PPG Industries, Inc.

Other siliceous pigments can be employed, such as clays, silicates, and pyrogenic silicas having about the same particle size. A typical pyrogenic, or fumed, silica is Cab-O-Sil manufactured by Cabot Corporation.

Coupling agents used in the present invention are compounds having the general formula A-R-B, wherein A is a functional group capable of bonding to the silica particles, R is any stable group connecting A and B, and B is a functional group such as a mercapto or a halomercapto group having a mercapto-like sulfur atom available for bonding to the rubber polymer.

In the broader aspects of the present invention, functional group A may provide a bond through any member of Group IV in the Periodic Table, particularly carbon, silicon, germanium, and tin. Alternatively, the bond may be through a member of Group V in the Periodic Table especially nitrogen or phosphorus. Furthermore, the bond may be through any multivalent element in rows 2 and 3 in the Periodic Table, especially oxygen and sulfur.

A preferred group A contains at least one nitrogen functional group capable of bonding to the siliceous pigment. Preferably, the nitrogen functional groups are selected from straight chain, primary, secondary, and tertiary amino groups. Most preferably, group A is a polyethyleneimine. Preferred coupling agents of this type are mercaptoalkylated polyethylene imines such as mercaptoethylated polyethyleneimine.

The more preferred group A is a silane group or any group that will provide a silicon atom that bonds with the silica particle. Group A may have the formula

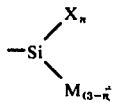

X is any moiety that will react with the silanols present in the silica, thereby permitting the silicon atom of the coupling agent to bond to an oxygen atom of the silica. X can be, for example, a halide. The halide would be released as the hydrogen halide. alternatively, X can be an oxy-group OR''. R'' and M independently can be an H, alkyl, cycloalkyl, aryl, or acyl group or a member of these groups bearing substituents such as one of the halides. R'' and M are preferably hydrocarbon groups containing between one and 10 carbon atoms, and $n$ is 1, 2, or 3.

Group A may have two or more silicon atoms linked by a nitrogen or oxygen atom and having substituents as set forth above. Group A may also be bifunctional, having an -R-B group attached to each of two silicon atoms in Group A. Groups of this type are described in U.S. Pats. Nos. 3,664,403, 3,768,537, and 3,737,334.

Group R is a connecting group and as such can be any group capable of connecting A with B in a stable manner. In some instances, R may be a chemical bond directly between A and B but generally R will be a hydrocarbon chain or ring group. R is preferably a hydrocarbon having from 1 to 10 carbon atoms, and more preferably an alkyl hydrocarbon having from 1 to 4 carbon atoms. The hydrocarbon chain, however, may be longer and may be branched. Group R may further be a saturated cycloalkyl of any size such as cyclopentyl, cyclohexyl, cyclooctyl, etc. The saturated cycloalkyl may bear substituents such as methyl, ethyl, or propyl groups. The functional groups A and B may be joined directly to the ring or to the substituent. R may also be bicycloalkyl and tricycloalkyl. R may also be a combination of organic groups linked together, such as an ester, an ether, or an amide. Other examples of group R are set forth in U.S. Pats. Nos. 3,737,334 and 3,768,537.

Group B is preferably the mercapto group —SH, which provides very good coupling efficiency but also has a great tendency to cause scorch. Group B may be another scorch inducing sulfur group which has mercaptolike properties in the rubber compound or which reacts during processing to form a mercapto-like intermediate. For example, B may be a halomercapto group such as S—Cl and S—Br; a thioepoxide group; or a disulfide group.

Preferred coupling agents are mercaptoalkyltrialkoxysilanes in which the alkyl and alkoxy groups have from 1 to 10 carbons, preferably 1 to 4 carbons. Examples include 3-mercaptopropyltrimethoxysilane, 3-mercaptopropyltriethoxysilane, 2-mercaptoethyltrimethoxysilane, and 2-mercaptoethyltriethoxysilane.

Vulcanization accelerators preferred for use with the present invention include benzothiazyl sulfenamides and disulfides. These agents are well knwon in the art. See, for example, the description of the "second accelerator" in U.S. Pat. No. 3,852,250. Specific examples include 2-(4-morpholinothio)-benzothiazole, N-t-butyl-2-benzothiazyl sulfenamide, N-cyclohexyl-2-benzothiazyl sulfenamide, N,N-dicyclohexyl-2-benzothiazyl sulfenamide, N,N-diisopropyl-2-benzothiazyl sulfenamide, 2,2'-dibenzothiazyl disulfide, 2-(4-morpholinodithio)-benzothiazole, and N,N-diethyl-2-benzothiazyl sulfenamide. The benzothiazyl portion of these vulcanizing agents may bear substituents such as nitro, halo alkyl, cycloalkyl, alkoxy, aryl, or other inert groups, i.e., groups which do not interfere substantially with the vulcanizing function.

Other conventional accelerator compounds may also be used, such as thiocarbamates, thioureas, xanthates, thiuramsulfides, and aromatic and aliphatic amines and their condensation products. Examples of these include cyclohexylethylamine, dibutylamine, acetaldehyde-aniline condensation products, heptaldehyde-aniline condensation product, N,N'-dibutylthiourea, dimethylethylthiourea, diphenylthiourea, tetramethylthiourea, sodium isopropylxanthate, zinc dibutylxanthate, bismuth dimethyldithiocarbamate, cadmium diethyldithiocarbamate, 2-benzothiazyl-N,N-diethyldithiocarbamate, dimethylammonium dimethyldithiocarbamate, zinc dimethylpentamethylenedithiocarbamate, dipentamethylenethiuram tetrasulfide, dimethyldiphenylthiuram disulfide, and dipentamethylenethiuram monosulfide. Other examples are shown in J. Van Alphen, Rubber Chemicals, (Boston: D. Reidel Publishing Co., 1973).

Preferred secondary accelerators for increasing the cure rate of rubber compounds of the present invention include guanidine derivatives such as N,N-diphenylguanidine, N,N'-ortho-tolylguanidine, orthotolylbiguanidine, N,N',N''-triphenylguanidine, blends of diarylguanidines, etc. Often an accelerator compound may be used as an accelerator or as a secondary accelerator depending on the particular rubber compound being formulated.

The rubber compounds may be mixed in any conventional manner, for example, in a Banbury or on a roll mill. It is common to use a two-stage mixing process. In the first stage, preferably in a Banbury, all ingredients except the curatives, i.e., the sulfur, the activator such as zinc oxide, and the accelerators, are combined into a masterbatch. In the second stage, generally on a roll mill, the curatives are added to the masterbatch to complete a vulcanizable rubber compound.

The coupling agent can be added to any of several points in the compounding process. For example, satisfactory rubber compositions can be obtained when the coupling agent is reacted with or adsorbed onto the silica before the silica is added to the rubber batch. The coupling agent can be incorporated into the rubber batch before the silica is added, or it can be added together with the silica and various other additives, such as the scorch retardant, during the Banbury mixing. Preferably, the coupling agent is mixed with the silica and rubber prior to the incorporation of any of the polar additives, particularly soaps, metal oxides, especially zinc oxide, amines, glycols, and accelerators, especially guanidine, into the rubber batch.

The scorch retardant may be added to the rubber batch either in the Banbury or on the roll mill, especially when a substituted or unsubstituted dithiodimorpholine is used, i.e., a scorch retardant in which $R_1$ is a second thiomorpholine group. In either case it is preferable to incorporate the scorch retardant into the batch before the curatives are added. Ordinarily the scorch retardant is added to the masterbatch in the Banbury. Preferably, it is incorporated into the masterbatch in the Banbury with or after the silica and the coupling agent before other ingredients are added, particularly if a scorch retardant having a single thiomorpholine group per molecule such as 2-(4-morpholinothio)-benzothiazole or ethylmorpholine disulfide, is used. If desired, antioxidants may be added to the rubber before the silica, coupling agent, and scorch retardant are added.

The following examples illustrate specific rubber compounds which show increased scorch times and coupling efficiency. All parts and percentages in the examples and elsewhere in the specification and claims are by weight unless otherwise indicated.

Scorch times are measured both by the Oscillating Disk Rheometer test and by the Mooney Scorch test. In evaluating the scorch resistance of a rubber compound, the Mooney Scorch test result is considered to give a clearer indication of the scorch behavior of the compound under ordinary processing conditions.

EXAMPLE I

Rubber compounds 1A through 1F were prepared having the formulations in Table I-1. The first seven ingredients were mixed in a Banbury for about 4 minutes at about 120° to 150° C. The last three ingredients marked by an asterisk were added during mixing on a roll mill which continued for about 6 minutes at about 90° to 120° C.

TABLE I-1

| Rubber Compound | 1A | 1B | 1C | 1D | 1E | 1F |
|---|---|---|---|---|---|---|
| Natural Rubber (SMR-5L)[1] | 98 | 98 | 98 | 98 | 98 | 98 |
| Hi-Sil 233[2] | 50 | 50 | 50 | 50 | 50 | 50 |
| Stearic Acid | 2 | 2 | 2 | 2 | 2 | 2 |
| Antidegradant[3] | 1 | 1 | 1 | 1 | 1 | 1 |
| Sundex 790[4] | 10 | 10 | 10 | 10 | 10 | 10 |
| Silane[5] | 1 | 1 | 1 | 3 | 3 | 3 |
| 4,4'-Dithiodimorpholine | — | 1.5 | 3 | — | 1.5 | 3 |
| Sulfenamide[6]* | 1.4 | 1.4 | 1.4 | 1.4 | 1.4 | 1.4 |
| Sulfur* | 2.5 | 1.75 | 1.0 | 2.5 | 1.75 | 1.0 |
| ZnO Master[7]* | 6 | 6 | 6 | 6 | 6 | 6 |

[1]Standard Malaysian Rubber having light color, less than 0.5% dirt, and less than 0.5% ash.
[2]A precipitated, hydrated, amorphous silica having an ultimate particle size of 20 nanometers, a BET surface area of approximately 150 m²/g, containing 87.5% SiO₂, 0.75% CaO, 0.95% R₂O₃, 1.6% NaCl, and having a weight loss of 6.3% at 105° C., with the balance being bound water, manufactured by PPG Industries, Inc.
[3]N-(1,3-dimethylbutyl)-N'-phenyl-p-phenylenediamine
[4]A softener: an aromatic petroleum oil manufactured by Sun Oil Company
[5]3-mercaptopropyltrimethoxysilane
[6]N-t-butylbenzothiazyl sulfenamide
[7]Blend of SMR-5L and zinc oxide in 1:2 ratio by weight Compounds 1A through 1F were then subjected to standard physical and stress/strain tests which are shown with the resulting data in Table I-2.

TABLE I-2

| Compound No. | 1A | 1B | 1C | 1D | 1E | 1F |
|---|---|---|---|---|---|---|
| Rheometer, 150° C.[1] | | | | | | |
| Scorch, min. | 11.5 | 10.5 | 8.5 | 1.5 | 11.0 | 9.0 |
| 90% cure, min. | 23.0 | 26.0 | 25.0 | 9.0 | 19.5 | 21.5 |
| Mooney Scorch, 130° C.[2] | | | | | | |
| Scorch Time (T₅), min. | 21.9 | 23.0 | 18.2 | 2.9 | 23.5 | 18.7 |
| Viscosity (Mv) | 25 | 27 | 25 | 41 | 26 | 30 |
| Stress-Strain | | | | | | |
| Cure: 30 min., 150° C. | | | | | | |
| Tensile, MPa[3] | 25.72 | 27.44 | 28.55 | 22.82 | 29.72 | 28.61 |
| 300% modulus, MPa[3] | 5.17 | 6.69 | 9.58 | 7.65 | 10.48 | 12.20 |
| Elongation, % | 680 | 640 | 590 | 580 | 600 | 520 |
| Hardness, Shore A[4] | 54 | 54 | 63 | 54 | 56 | 57 |
| Goodrich Flexometer[5] | | | | | | |
| Cure, 30 min. at 150° C. | | | | | | |
| Heat Buildup, ° C. | 22 | 18 | 14 | 25 | 14 | 16 |
| Permanent Set, % | 8.4 | 7.4 | 3.0 | 9.2 | 3.3 | 3.2 |
| Pico Abrasion[6] | | | | | | |

TABLE I-2-continued

| Compound No. | 1A | 1B | 1C | 1D | 1E | 1F |
|---|---|---|---|---|---|---|
| Cure, 30 min. at 150° C. | 79 | 113 | 85 | 85 | 104 | 125 |

[1]ASTM D-2705-68 T
[2]ASTM D-1646-68
[3]ASTM D-412-49 T
[4]ASTM D-314
[5]ASTM D-623-67, Method A
[6]ASTM D-2228-63 T The data in Table I-2 show that use of a scorch retardant as contemplated by the present invention effects a substantial increase in scorch time and also in coupling efficiency as indicated by the Pico abrasion index and 300% modulus values. Adding more scorch retardant than is necessary to retard scorch improves tensile strength and 300% modulus values with only a small decrease in scorch retardation. In compounds 1d-1F high levels of silane caused severe scorching. Addition of scorch retardant increased scorch time eight-fold while increasing cure time only two-fold. Cure time remained acceptable fast.

EXAMPLE II

Rubber compounds 2A through 2C were prepared according to the formulations of Table II-1. The first ten ingredients were mixed in a Banbury for about 4 minutes at about 120° to 150° c. The last three ingredients marked by an asterisk were added during mixing on a roll mill which continued for about 6 minutes at about 90° to 120° C.

TABLE II-1

| Compound No. | 2A | 2B | 2C |
|---|---|---|---|
| Natural Rubber (SMR-H-5L) | 100 | 100 | 100 |
| Hi-Sil EP[1] | 50 | 50 | 50 |
| Stearic Acid | 1.5 | 1.5 | 1.5 |
| 3-mercaptopropyltrimethoxysilane | 1.0 | 1.0 | 1.0 |
| Sunproof Improved[2] | 1.5 | 1.5 | 1.5 |
| Antidegradant[3] | 1.0 | 1.0 | 1.0 |
| Wingstay 100[4] | 1.0 | 1.0 | 1.0 |
| Plastogen[5] | 5.0 | 5.0 | 5.0 |
| Zinc Oxide | 5.0 | 5.0 | 5.0 |
| 4,4'-Dithiodimorpholine | — | — | 1.0 |
| 2-(4-morpholinothio)-benzothiazole* | 1.0 | 1.0 | 1.0 |
| N,N'-diphenylguanidine* | 0.6 | 0.9 | 0.5 |
| Sulfur* | 2.0 | 2.0 | 2.0 |

[1]Precipitated, hydrated, amorphous silica having an ultimate particle size of 40 nanometers, a BET surface area of 50–70 meter[2]/gram, containing 87% SiO$_2$, 2% NaCl, 1% CaO, 1.75% R$_2$O$_3$, and having a pH, in 5% dispersion in water, of 6.5 to 7.3, manufactured by PPG Industries, Inc.
[2]A paraffin-type microcrystalline wax manufactured by Uniroyal, Inc.
[3]A 25:25:50 blend of N,N'-diphenyl-p-phenylenediamine, 4,4'-dimethoxy-diphenylamine, and N-phenyl-beta-naphtylamine
[4]A mixed diaryl-p-phenylenediamine manufactured by The Goodyear Tire and Rubber Company
[5]A mixture of an oil soluble sulfonic acid of high molecular weight with a paraffin oil, manufactured by R. T. Vanderbilt Co., Inc.

Compounds 2A-2C were then subjected to standard physical and stress-strain test which are shown with the resulting data in Table II-2.

TABLE II-2

| Compound No. | 2A | 2B | 2C |
|---|---|---|---|
| Rheometer, 149° C. | | | |
| Scorch, min. | 2.5 | 2.0 | 5.0 |
| 95% cure, min. | 8.5 | 7.5 | 10.5 |
| Mooney Scorch, 121° C. | | | |
| Scorch Time (T$_5$), min. | 5.3 | 1.8 | 16.5 |
| Scorch Time (T$_{35}$), min. | 8.0 | 3.5 | 30 |
| Viscosity (Mv) | 49 | 48 | 49 |
| Stress/Strain | | | |
| Tensile Strength, MPa | 24.00 | 25.50 | 23.30 |
| 300% modulus, MPa | 9.10 | 10.50 | 11.40 |
| Elongation, % | 550 | 540 | 500 |

TABLE II-2-continued

| Compound No. | 2A | 2B | 2C |
|---|---|---|---|
| Hardness, Shore A | 62 | 60 | 60 |

The data in Table II-2 show that when a guanidine derivative secondary accelerator is used to speed the curing of rubber compounds containing a mercaptosilane coupling agent, scorch times can become unacceptably short. The 4,4'-dithiodimorpholine present in compound 2C substantially increases scorch time while only slightly increasing curing time.

EXAMPLE III

Compounds 3A and 3B were prepared according to the formulation of Table V. The scorch retardants were added in the Banbury. The vulcanizing agents marked by an asterisk were subsequently added on the mill.

TABLE III-1

| Compound No. | 3A | 3B |
|---|---|---|
| SBR-1502[1] | 98 | 98 |
| Hi-Sil 233 | 60 | 60 |
| 2-mercaptoethyltriethoxysilane | 1.2 | 1.2 |
| Sundex 790[2] | 10 | 10 |
| Stearic Acid | 1 | 1 |
| Flexamine[3] | 1 | 1 |
| 4,4'-Dithiodimorpholine | — | 1 |
| 2,2'-Dibenzothiazyl disulfide* | 1.2 | 1.2 |
| N,N'-Di-ortho-tolylguanidine* | 1.2 | 1.2 |
| Sulfur* | 2.5 | 2.5 |
| ZnO Master[4]* | 6 | 6 |

[1]Cold polymerized, non-pigmented styrene-butadiene rubber, International Institute of Synthetic Rubber Producers, Inc., grade number 1502.
[2]Trademark of Sun Oil Company
[3]Blend of complex diarylamine-ketone reaction product and N,N'-diphenyl-p-phenylenediamine in 65:35 ratio, manufactured by Uniroyal, Inc.
[4]Blend of SBR-1502 and zinc oxide in 1:2 ratio by weight Compounds 3A and 3B were then subjected to standard physical and stress/strain tests which are shown with the resulting data in Table III-2.

TABLE III-2

| Rubber Compound | 3A | 3B |
|---|---|---|
| Rheometer, 150° C. | | |
| Scorch, min. | 4.5 | 7.5 |
| 90% Cure, min. | 22.5 | 19.0 |
| 95% Cure, min. | 27.5 | 23.5 |
| Mooney Scorch, 130° C. | | |
| Scorch (T$_5$), min. | 9.0 | 15.3 |
| Viscosity (Mv) | 31 | 25 |
| Stress/Strain | | |
| Cure: 30 min. at 150° C. | | |
| Tensile, MPa | 23.20 | 19.20 |
| 300% Modulus, MPa | 10.30 | 9.60 |
| Elongation, % | 520 | 440 |
| Hardness, Shore A | 70 | 70 |
| Pico Abrasion | | |
| Cure: 45 min. at 150° C. | | |
| Abrasion Index | 103 | 90 |

The data of Table III-2 show that 4,4'-dithiomorpholine retards scorch in a styrene-butadiene rubber compound with a mercaptoethyltriethoxysilane coupling agent and a sulfur, benzothiazyl disulfide and guanidine vulcanizing system. Stress/strain properties and abrasion resistance may be optimized by adjusting the relative amount of coupling agent and scorch retardant.

EXAMPLE IV

Compounds 4A through 4L were all prepared using a base compound made according to the formulation of Table IV-1. The identity of the accelerator and the presence or absence of the coupling agent and scorch retardant were variables in this series of compounds.

The first eight ingredients of the base compound were added in the Banbury. When coupling agent and scorch retardant were included in a compound, they were also added in the Banbury. The ingredients were added in the Banbury in the following sequence:

0 minutes — Rubber
1 minute — Antidegradant, Wingstay
2 minutes — Hi-Sil, Silane, 4,4'-dithiodimorpholine as required
4 minutes — Zinc Oxide, Stearic Acid, Sunproof Imp.
5 minutes — Plastogen
6 minutes — Dump (150° C.–160° C.)

The last two ingredients of the base compound, marked by an asterisk, and the sulfenamide accelerator were added to the compound during mixing on a roll mill. Milling was continued for about 6 minutes at about 90°–120° C.

TABLE IV-1

| Base Compound | |
|---|---|
| Natural Rubber (SMR-H-5L) | 100.00 |
| Antidegradant[1] | 1.00 |
| Wingstay 100[2] | 1.00 |
| Hi-Sil 233 | 50.00 |
| Zinc Oxide | 5.00 |
| Stearic Acid | 1.50 |
| Sunproof Improved[3] | 1.50 |
| Plastogen[4] | 5.00 |
| Sulfur* | 2.50 |
| N,N'-diphenylguanidine* | 1.25 |

[1]A 25:25:50 blend of N,N'-diphenyl-p-phenylene-diamine, 4,4'-dimethoxydiphenylamine, and N-phenyl-beta-naphthylamine
[2]Trademark of The Goodyear Tire and Rubber Company
[3]Trademark of Uniroyal, Inc.
[4]Trademark of R. T. Vanderbilt Co., Inc.

Table IV-2 presents the remaining ingredients of compounds 4A through 4L. In each compound, the accelerator was added on the mill, and silane coupling agent and thiomorpholine scorch retardant were added in the Banbury.

TABLE IV-2

| Compound No. | 4A | 4B | 4C | 4D | 4E | 4F | 4G | 4H | 4I | 4J | 4K | 4L |
|---|---|---|---|---|---|---|---|---|---|---|---|---|
| Accelerator | | | | | | | | | | | | |
| Sulfenamide[1] | 1.0 | 1.0 | 1.0 | — | — | — | — | — | — | — | — | — |
| Disulfide[2] | — | — | — | 1.0 | 1.0 | 1.0 | — | — | — | — | — | — |
| Sulfenamide[3] | — | — | — | — | — | — | 1.0 | 1.0 | 1.0 | — | — | — |
| Sulfenamide[4] | — | — | — | — | — | — | — | — | — | 1.0 | 1.0 | 1.0 |
| Silane[5] | — | 1.0 | 1.0 | — | 1.0 | 1.0 | — | 1.0 | 1.0 | — | 1.0 | 1.0 |
| 4,4'-Dithiodimorpholine | — | — | 1.0 | — | — | 1.0 | — | — | 1.0 | — | — | 1.0 |

[1]N,N-diisopropyl-2-benzothiazyl sulfenamide
[2]2,2'-dibenzothiazyl disulfide
[3]N-cyclohexyl-2-benzothiazyl sulfenamide
[4]2-(4-morpholinothio)-benzothiazole
[5]3-mercaptopropyltrimethoxysilane Compounds 4A through 4L were subjected to standard physical and stress-strain tests which are reported with results in Table IV-3.

TABLE IV-3

| Compound No. | 4A | 4B | 4C | 4D | 4E | 4F | 4G | 4H | 4I | 4J | 4K | 4L |
|---|---|---|---|---|---|---|---|---|---|---|---|---|
| Rheometer, 149° C. | | | | | | | | | | | | |
| 90% Cure, minutes | 49.0 | 27.0 | 16.5 | 29.5 | 13.5 | 10.0 | 32.0 | 11.5 | 14.0 | 36.0 | 14.5 | 17.0 |
| Scorch, minutes | 4.0 | 0 | 2.0 | 6.0 | 2.5 | 3.0 | 11.5 | 3.0 | 5.0 | 11.0 | 4.0 | 5.0 |
| Mooney Scorch, 121° C. | | | | | | | | | | | | |
| Scorch ($T_5$), minutes | 21.7 | 5.5 | 16.7 | >30 | 9.1 | 11.9 | >30 | 11.6 | 22.0 | >30 | 16.4 | 29.6 |
| Viscosity (Mv) | 37 | 45 | 33 | 36 | 28 | 28 | 34 | 34 | 28 | 36 | 36 | 31 |
| Stress/Strain | | | | | | | | | | | | |
| Cure at 149° C., minutes | 40 | 20 | 20 | 30 | 10 | 10 | 30 | 20 | 15 | 40 | 15 | 15 |
| 300% modulus at 149° C., MPa | 3.20 | 5.10 | 6.50 | 3.30 | 5.40 | 7.70 | 3.80 | 6.60 | 8.40 | 3.40 | 6.10 | 8.20 |
| Tensile strength, MPa | 21.80 | 22.30 | 26.30 | 21.60 | 25.90 | 27.90 | 23.00 | 25.70 | 27.20 | 21.40 | 28.10 | 27.90 |
| Elongation, % | 720 | 630 | 600 | 720 | 680 | 620 | 720 | 640 | 600 | 710 | 680 | 600 |
| Hardness, Shore A | 59 | 58 | 60 | 62 | 57 | 65 | 60 | 59 | 65 | 61 | 60 | 64 |
| Goodrich Flexometer | | | | | | | | | | | | |
| Cure at 149° C., minutes | 50 | 40 | 30 | 45 | 35 | 30 | 50 | 25 | 30 | 50 | 30 | 30 |
| Heat Buildup, ° C. | 57 | 53 | 37 | 56 | 50 | 24 | 56 | 32 | 24 | 57 | 47 | 37 |
| Permanent Set, % | 51.5 | 38.4 | 24.2 | 44.4 | 32.6 | 12.9 | 45.4 | 21.8 | 15.9 | 49.6 | 30.7 | 27.6 |
| Pico Abrasion | | | | | | | | | | | | |
| Cure at 149° C., minutes | 45 | 40 | 30 | 40 | 30 | 25 | 45 | 20 | 25 | 45 | 25 | 25 |
| Abrasion Index | 59 | 75 | 84 | 65 | 81 | 98 | 75 | 95 | 94 | 66 | 90 | 99 |

The data in Table IV-3 show that a thiomorpholine scorch retardant is effective in retarding scorch and in improving the properties of rubbers containing a variety of sulfenamide and disulfide accelerators. Compounds 4C, 4F, 4I, and 4L, all containing the scorch retardant and the coupling agent, show improvement in scorch time, 300% modulus, tensile strength (except compound 4L), hardness, heat buildup, permanent set, and abrasion index values (except compound 4I), over the corresponding values for compounds 4B, 4E, 4H, and 4K, which contain only the coupling agent.

Although the present invention has been described with reference to the specific details of particular embodiments in order to illustrate the invention, it is not intended to limit the scope of the invention thereto except insofar as such details are set forth in the appended claims.

I claim:

1. A sulfur vulcanizable rubber compound comprising rubber; 5 to 200 parts per 100 parts of rubber of finely divided siliceous pigment; 0.1 to 15 parts per 100 parts of rubber of a coupling agent represented by the general formula A-R-B, wherein A represents a functional group capable of bonding to the siliceous pigment, B represents a sulfur functional group selected from the group consisting of mercapto, halomercapto, thioepoxide, and disulfide groups, and R represents a stable group which connects A and B; 0.2 to 8 parts per 100 parts of rubber of sulfur curative; and 0.1 to 15 parts per hundred parts of rubber of a thiomorpholine scorch retardant represented by the formula:

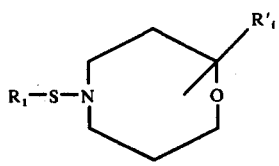

wherein $R_1$ is an active group that will allow the thiomorpholine group to retard scorch, each $R'$ independently is an inert substituent, and $i$, the number of inert substitutents, is 0, 1, 2, or 3.

2. The rubber compound of claim 1 wherein $R_1$ is hydrogen, so that the scorch retardant is a 4-mercaptomorpholine.

3. The rubber compound of claim 1 wherein $R_1$ is a thiomorpholine group represented by the formula:

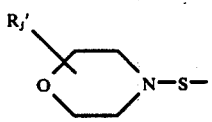

wherein each $R'$ independently is an inert substituent and $j$, the number of inert substituents, is 0, 1, 2, or 3.

4. The rubber compound of claim 3 wherein each $R'$ independently is selected from the group consisting of lower alkyl, cycloalkyl, lower alkoxy, halo, nitro, and aryl groups.

5. The rubber compound of claim 1 wherein the coupling agent is a mercapto alkyltrialokoxysilane.

6. The rubber compound of claim 5 wherein the coupling agent is 3-mercaptopropyltrimethoxysilane and the scorch retardant is 4,4'-dithiodimorpholine.

7. The rubber compound of claim 1 wherein $R_1$ is a benzothiazyl group represented by the formula:

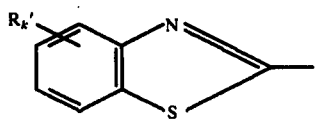

wherein each $R'$ independently is an inert substituent and $k$, the number of inert substituents, is 0, 1, 2, or 3.

8. The rubber compound of claim 7 wherein each $R'$ independently is selected from lower alkyl, cycloalky, lower alkoxy, halo, nitro, and aryl groups.

9. The rubber compound of claim 8 wherein the scorch retardant is 2-(4-morpholinothio)-benzothiazole.

10. The rubber compound of claim 1 wherein $R_1$ is a group joined to the thiomorpholine group through a disulfide bond.

11. The rubber compound of claim 10 wherein $R_1$ is represented by the formula $R_2$—S—, wherein $R_2$ may bear inert substituents and is selected from the group consisting of benzothiazyl groups, lower aliphatic and cycloaliphatic groups having from 1 to 12 carbons, and aryl groups having from 6 to 12 carbons.

12. The rubber compound of claim 11 wherein the scorch retardant is 2-(4-morpholinodithio)-benzothiazole.

13. The rubber compound of claim 1 wherein the sulfur curative comprises sulfur and a vulcanization accelerator.

14. The rubber compound of claim 13 wherein the vulcanization accelerator is selected from the group consisting of benzothiazyl sulfenamides and benzothiazyl disulfides.

15. The rubber compound of claim 14 wherein the vulcanization accelerator is selected from the group consisting of N-tertiary-butyl-2-benzothiazyl sulfenamide, 2-(4-morpholinothio)-benzothiazole, 2,2'-dibenzothiazyl disulfide, N,N-diisopropyl-2-benzothiazyl sulfenamide, and N-cyclohexyl-2-benzothiazyl sulfenamide.

16. A vulcanizate of the rubber compound of claim 1.

17. A method for retarding scorch which comprises employing 0.1 to 15 parts per 100 parts of rubber of a thiomorpholine scorch retardant in a sulfur vulcanizable rubber compound comprising rubber; 5 to 200 parts per 100 parts of rubber of finely divided siliceous pigment; 0.1 to 15 parts per 100 parts of rubber of a coupling agent represented by the general formula A-R-B, wherein A represents a functional group capable of bonding to the siliceous pigment, B represents a sulfur functional group selected from the group consisting of mercapto, halomercapto, thioepoxide, and disulfide groups, and R represents a stable group which connects A and B; and 0.2 to 8 parts per 100 parts of rubber of sulfur curative; the thiomorpholine scorch retardant being represented by the formula:

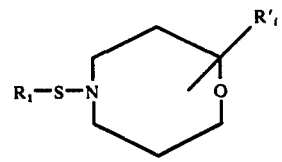

wherein $R_1$ is an active group that will allow the thiomorpholine group to retard scorch, each $R'$ independently is an inert substituent, and $i$, the number of inert substituents, is 0, 1, 2, or 3.

18. The method of claim 17 wherein $R_1$ is a thiomorpholine group represented by the formula:

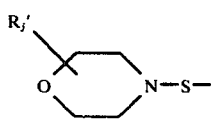

wherein each R' independently is an inert substituent and j, the number of inert substituents, is 0, 1, 2, or 3.

19. The method of claim 17 wherein $R_1$ is a benzothiazyl group represented by the formula:

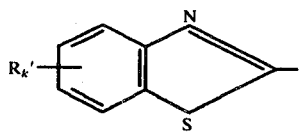

wherein each R' independently is an inert substituent and k, the number of inert substituents, is 0, 1, 2, or 3.

20. The method of claim 17 wherein $R_1$ is a group joined to the thiomorpholine group through a disulfide bond.

21. The method of claim 20 wherein $R_1$ is represented by the formula:

$$R_2—S—$$

wherein $R_2$ may bear inert substituents and is selected from the group consisting of benzothiazyl groups, lower aliphatic and cycloaliphatic groups having from 1 to 12 carbons, and aryl groups having from 6 to 12 carbons.

22. The method of claim 18 wherein the coupling agent is a mercaptoalkyltrialkoxysilane and the scorch retardant is 4,4'-dithiodimorpholine.

23. The method of claim 17 which comprises incorporating the scorch retardant into the rubber compound before adding the sulfur curative.

24. The method of claim 17, wherein $R_1$ is hydrogen, so that the scorch retardant is a 4-mercaptomorpholine.

* * * * *